(12) United States Patent
Mayer

(10) Patent No.: US 7,051,237 B2
(45) Date of Patent: May 23, 2006

(54) PROGRAM-CONTROLLED UNIT

(75) Inventor: Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 628 days.

(21) Appl. No.: 10/190,813

(22) Filed: Jul. 8, 2002

(65) Prior Publication Data

US 2003/0014695 A1    Jan. 16, 2003

(30) Foreign Application Priority Data

Jul. 6, 2001    (DE) ................................ 101 32 313

(51) Int. Cl.
*G06F 11/00*    (2006.01)

(52) U.S. Cl. ........................................ 714/27; 714/733

(58) Field of Classification Search .................. 714/45, 714/25, 30, 31, 37–39, 27, 28; 712/227; 717/124, 126, 128

See application file for complete search history.

(56) References Cited

U.S. PATENT DOCUMENTS

| | | | |
|---|---|---|---|
| 4,383,188 A | 5/1983 | Crosby | |
| 5,053,949 A * | 10/1991 | Allison et al. ................. | 714/31 |
| 6,094,729 A | 7/2000 | Mann | |
| 6,421,795 B1 * | 7/2002 | Yamashita .................... | 714/45 |
| 6,647,545 B1 * | 11/2003 | Kurts et al. ................. | 717/128 |
| 6,665,816 B1 * | 12/2003 | Edwards et al. ............. | 714/30 |
| 6,732,307 B1 * | 5/2004 | Edwards ..................... | 714/724 |

FOREIGN PATENT DOCUMENTS

| | | |
|---|---|---|
| GB | 2 073 459 A | 10/1981 |
| WO | WO 00/63777 | 10/2000 |

\* cited by examiner

*Primary Examiner*—Dieu-Minh Le
(74) *Attorney, Agent, or Firm*—Laurence A. Greenberg; Werner H. Stemer; Ralph E. Locher

(57) ABSTRACT

A program-controlled unit has debug resources that outputs trace information including selected addresses, data and/or control signals and that can be used to trace the course of the operations occurring within the program-controlled. The debug resources monitor whether a predefined change in the level of one or more predefined bits of the addresses, data and/or control signals contained in the trace information has taken place, and start or terminate the generation of trace information as a function of the result of this check. Additionally or alternatively, the trace information that is output is a component of messages having a variable length portion that contains the trace information. Additionally or alternatively, the trace information that is output is a component of messages, and it is possible to determine which trace information is located at which point within the message.

104 Claims, 2 Drawing Sheets

PROGRAM-CONTROLLED UNIT

BACKGROUND OF THE INVENTION

Field of the Invention

The present invention relates to a program-controlled unit, with debug resources that enables trace information, which includes selected addresses, data and/or control signals to be output. The debug resources can be used to trace the course of the operations occurring within the program-controlled unit.

Program-controlled units such as microprocessors, microcontrollers, signal processors, etc. have been known in numerous embodiments for many years.

A known problem of program-controlled units is that faults which occur in them frequently cannot readily be located and/or eliminated easily.

Faults occurring in program-controlled units were in the past, and to a certain extent still are today, located and eliminated using special bond-out versions of the program-controlled units that are investigated. Bond-out versions of program-controlled units differ from the standard versions of the respective program-controlled units used in mass-produced items in that they have more input and/or output terminals. The additional input and/or output terminals are connected to points in the program-controlled unit that are not freely accessible in the standard version of the program-controlled unit. As a result, information relating to internal states or operations, to be more precise information relating to information which is not normally output, such as the respective current state of the program counter or instruction pointer, can be output from the program-controlled unit and evaluated outside the program-controlled unit. By evaluating this information, the course of the operations occurring within the program-controlled unit can be traced, thus allowing faults occurring in the program-controlled unit to be located and eliminated.

However, the use of bond-out versions is associated with a series of disadvantages. In particular, the bond-out versions of the program-controlled units are larger and more expensive than the standard versions, and even more importantly, the bond-out versions generally do not behave precisely in the same way as the standard versions.

For this reason, in some cases the practice has been adopted of equipping the program-controlled unit with debug resources which extract information required for fault locating and fault recovery from the program-controlled unit and output the information from the program-controlled unit, or store it internally, by using an interface which includes only a small number of pins and which can in some cases also be used for other purposes.

Such a program-controlled unit is represented in FIG. 2.

The program-controlled unit shown in FIG. 2 is a microcontroller and contains a core C, peripheral units P1, P2, P3 that are connected to the core C via a first bus BUS1, storage units S1, S2, S3 that are connected to the core C via a second bus BUS2, debug resources DR that are connected to the core C, and an interface SS that is assigned to the debug resources DR. The debug resources DR uses the interface SS to output data to an external device. The debug resources DR are controlled, via the interface SS by the external device.

The peripheral units P1 to P3 are, for example, an A/D converter, a timer, an encoder, a compressor device, a CAN interface, or other units which can be integrated into microcontrollers. The storage units are, for example, a RAM, a ROM and a flash memory.

The debug resources DR are preferably capable of outputting what is referred to as trace information. This is generally carried out by having the debug resources DR monitor whether the program counter, or an address which is currently being accessed, has a specific value or lies within a specific value range. Whenever this is the case, the current state of the program counter and/or the address which is currently being accessed and/or the data which is being transferred to or from this address is output from the program-controlled unit without interrupting the operation of the program-controlled unit.

In general, the debug resources DR also carry out further actions which are necessary or helpful for locating and eliminating faults which occur in the program-controlled unit. For example, the debug resources DR are, for example, frequently capable, when certain conditions occur, for example when a specific program counter reading is reached, of:

outputting a signal, which signals this state, from the program-controlled unit, and/or
of stopping the program-controlled unit and reading out, or changing, the contents of registers which are of interest.

Such debug resources, which are also referred to as OCDS (on-chip debugging support) modules, are known so that further details are not described.

Because of the increasing significance of the presence of debug resources in program-controlled units, a standard for the interface (SS) which is referred to as "The Nexus 5001 Forum Standard for a Global Embedded Processor Debug Interface" was defined in 1999 by the IEEE Industry Standards and Technology Organization (IEEE-ISTO). The debug resources are able to exchange data with a device provided outside the program-controlled unit, such as a debug control unit or emulation control unit, or with a measuring device, such as for example, a logic analyzer, in a particularly efficient way.

The debug resources and the NEXUS interface permit faults occurring in program-controlled units to be detected and eliminated with relatively little expenditure.

Nevertheless, outputting trace information from the program-controlled unit is frequently a problem. On the one hand, the trace information should include as much data as possible so that the operations occurring in the program-controlled unit can be traced simply, quickly and precisely. On the other hand, the trace information should have the smallest possible scope so that it can be output from the program-controlled unit using as few pins of the program-controlled unit as possible. This is because each pin causes the program-controlled unit to be larger and more expensive.

SUMMARY OF THE INVENTION

It is accordingly an object of the invention to provide a program-controlled unit which overcomes the above-mentioned disadvantages of the prior art apparatus of this general type.

In particular, an object of the invention is to output trace information, which is required for observing the operations occurring within the program-controlled unit, from the program-controlled unit with little expenditure in a comprehensive way.

With the foregoing and other objects in view there is provided, in accordance with the invention, a program-controlled unit, including: debug resources using trace information including given information that can be selected addresses, data signals, and/or control signals; and an output for outputting the trace information to trace a course of operations occurring within the program-controlled unit. The debug resources monitors whether a predefined change in a level of at least one predefined bit of the given information in the trace information has taken place. The debug resources can either start to generate the trace information as a result of the monitoring or can stop generating the trace information as a result of the monitoring.

With the foregoing and other objects in view there is provided, in accordance with the invention, a program-controlled unit, including: debug resources using trace information including given information that can be selected addresses, data signals, and/or control signals; and an output for outputting the trace information to trace a course of operations occurring within the program-controlled unit. The trace information that is output forms a component of a message; and the component has a variable length.

With the foregoing and other objects in view there is provided, in accordance with the invention, a program-controlled unit, including: debug resources using trace information including given information that can be selected addresses, data signals, and/or control signals; and an output for outputting the trace information to trace a course of operations occurring within the program-controlled unit. The trace information that is output forms a component of a message; and it is possible to determine which trace information will be located at which point within the message.

In accordance with an added feature of the invention, the trace information, which is output at the output, includes data that represents changes in current values of the given information with respect to immediately previous values of the given information.

In accordance with an additional feature of the invention, the trace information includes control signals that are transferred within or between the components of the program-controlled unit.

In accordance with another feature of the invention, the trace information includes interrupt request signals.

In accordance with a further feature of the invention, the trace information includes signals for signaling an occurrence of a fault.

In accordance with a further added feature of the invention, the trace information includes signals for signaling a successful execution of an action.

In accordance with a further additional feature of the invention, the debug resources has input terminals for receiving the given information that will be contained in the trace information that will be output; and it is possible to determine, from outside the program-controlled unit, which given information (which can be addresses, data signals, and/or control signals) are supplied to the input terminals.

In accordance with another further feature of the invention, the debug resources includes a masking unit for masking out particular ones of the given information that will not be taken into account. The particular ones of the given information can be addresses, data, and/or control signals that are supplied to the debug resources.

In accordance with an added further feature of the invention, the particular ones of the given information that will be masked out can be externally determined.

In accordance with an additional further feature of the invention, the debug resources is supplied with the given information; and the debug resources includes a comparator logic device for checking whether there is a predefined change in the level of the at least one predefined bit of the given information that is being supplied to the debug resources.

In accordance with yet an added feature of the invention, by using the predefined change, it is determined which bit of the given information being supplied to the debug resources needs to have a level change for the comparator logic device to output a positive comparison result.

In accordance with yet an additional feature of the invention, the predefined change can be externally set.

In accordance with yet another feature of the invention, the debug resources includes a message generator that generates a message including the trace information that will be output; and the debug resources causes the message to be output.

In accordance with yet an additional feature of the invention, the message includes a part that contains the trace information; and the part of the message has a variable length.

In accordance with yet another feature of the invention, the length of the part of the message that contains the trace information depends on a content of the trace information that will be output.

In accordance with an added feature of the invention, the part of the message that contains the trace information contains only a part of the trace information that will actually be output.

In accordance with an additional feature of the invention, portions of the trace information that will be externally reconstructed are not output at the output.

In accordance with another feature of the invention, zeros, which during a transmission of all of the trace information, would normally be present at a beginning of the part of the message that contains the trace information, are not included in the part of the message that contains the trace information.

In accordance a further feature of the invention, ones, which during a transmission of all of the trace information, would normally be present at a beginning of the part of the message that contains the trace information, are not included in the part of the message that contains the trace information.

In accordance with a further added feature of the invention, zeros, which during a transmission of all of the trace information, would normally be present at an end of the part of the message that contains the trace information, are not included in the part of the message that contains the trace information.

In accordance with an added feature of the invention, ones, which during a transmission of all of the trace information, would normally be present at an end of the part of the message that contains the trace information, are not included in the part of the message that contains the trace information.

In accordance with an additional feature of the invention, the at least one predefined bit of the given information defines a predefined sequence of a plurality of bits that are supplied to the debug resources; and the debug resources includes a converter device that converts the plurality of the bits of the given information that are supplied to the debug resources into another, predefined sequence.

In accordance with a further feature of the invention, the predefined sequence can be externally set by a device that is external from the program-controlled unit.

In accordance with an added feature of the invention, the debug resources includes a comparator logic device for obtaining a result by checking whether there is a predefined change in the level of the at least one predefined bit of the given information that is being supplied to the debug resources. The debug resources include a message generator that generates a message including the trace information that will be output. The debug resources outputs the message, and the message generator operates as a function of the result obtained by the comparator logic device.

In accordance with an additional feature of the invention, the message generator causes an individual message to be output if the result obtained by the comparator logic device signals that a condition being checked by the comparator logic device is fulfilled.

In accordance with another feature of the invention, the message generator causes a specific number of messages to be output if the result obtained by the comparator logic device signals that a condition being checked by the comparator logic device is fulfilled.

In accordance with a further feature of the invention, the message generator causes an indeterminate number of messages to be output if the result obtained by the comparator logic device signals that a condition being checked by the comparator logic device is fulfilled.

In accordance with a further added feature of the invention, the message generator stops messages from being output if the result obtained by the comparator logic device signals that a condition being checked by the comparator logic device is fulfilled.

In accordance with a further additional feature of the invention, the message generator causes an individual message to be output if the result obtained by the comparator logic device signals that a condition being checked by the comparator logic device is not fulfilled.

In accordance with yet an added feature of the invention, the message generator causes a specific number of messages to be output if the result obtained by the comparator logic device signals that a condition being checked by the comparator logic device is not fulfilled.

In accordance with yet an additional feature of the invention, the message generator causes an indeterminate number of messages to be output if the result obtained by the comparator logic device signals that a condition being checked by the comparator logic device is not fulfilled.

In accordance with yet another feature of the invention, the message generator stops messages from being output if the result obtained by the comparator logic device signals that a condition being checked by the comparator logic device is not fulfilled.

In accordance with yet a further feature of the invention, the debug resources includes a message generator that generates a message including the trace information that will be output. The debug resources causes the message to be output. The message includes information relating to a time at which the given data in the trace information appeared in the program-controlled unit.

In accordance with an added feature of the invention, the debug resources includes a watchdog unit that checks a condition and that outputs a signal indicating whether or not the condition is fulfilled. The debug resources includes a component that assembles the trace information that will be output, and the component operates independently of the watchdog unit.

In accordance with an additional feature of the invention, the watchdog unit checks the condition by checking whether the given information in the trace information is in a particular state.

In accordance with a further feature of the invention, the debug resources includes a watchdog unit that checks a condition and that outputs a signal indicating whether or not the condition is fulfilled. The debug resources includes a component that outputs the trace information, and the component operates independently of the watchdog unit.

In accordance with a further added feature of the invention, the trace information is stored before being output at the output.

In accordance with yet an added feature of the invention, the trace information that is stored is output at the output in response to a corresponding request from a device provided external from the program-controlled unit.

The program-controlled unit according to the invention is defined such that:
  the debug resources monitor whether a predefined change in the level of one or more predefined bits of the addresses, data and/or control signals contained in the trace information has taken place, and start or terminate the generation of trace information as a function of the result of this check; and/or
  the trace information which is output is a component of messages in which the length of the part which contains the trace information is variable; and/or
  the trace information which is output is a component of messages, it being possible to determine which trace information will be located at which point within the message.

The abovementioned measures make it possible to ensure that only actually required trace information, and consequently also only the absolutely necessary quantity of trace information is output from the program-controlled unit. In this way, the scope of trace information which is output is relatively small, even if it includes a large amount of addresses, data and/or control signals.

Other features which are considered as characteristic for the invention are set forth in the appended claims.

Although the invention is illustrated and described herein as embodied in a program-controlled unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The program-controlled unit described below is a microcontroller. The particular features of the microcontroller which are described below, to be more precise the particular features of the debug resources provided in it which are described below can, however, also can be used in any other program-controlled units.

Figure 1:
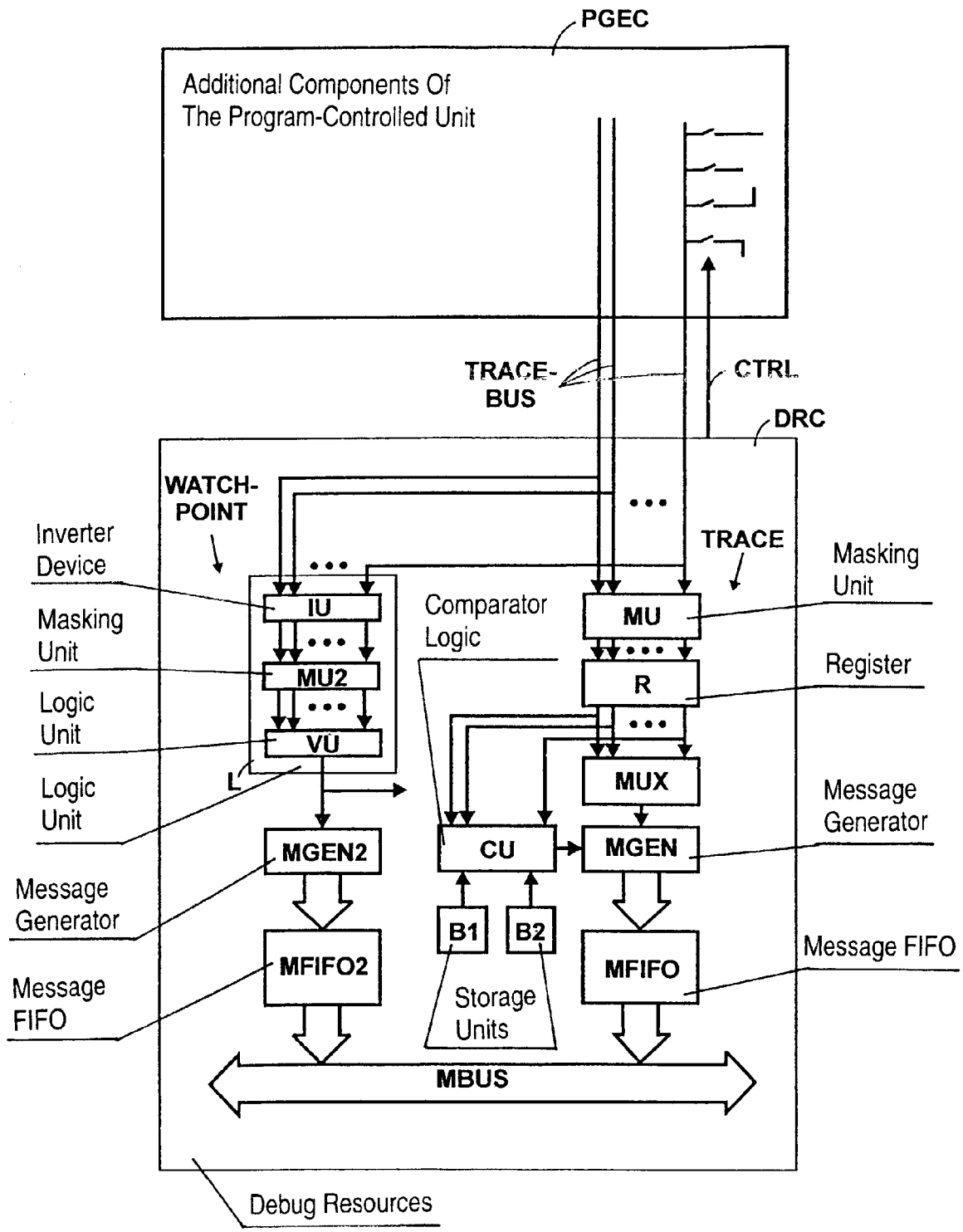
FIG. 1 is a block diagram of a program-controlled unit.
Figure 2:
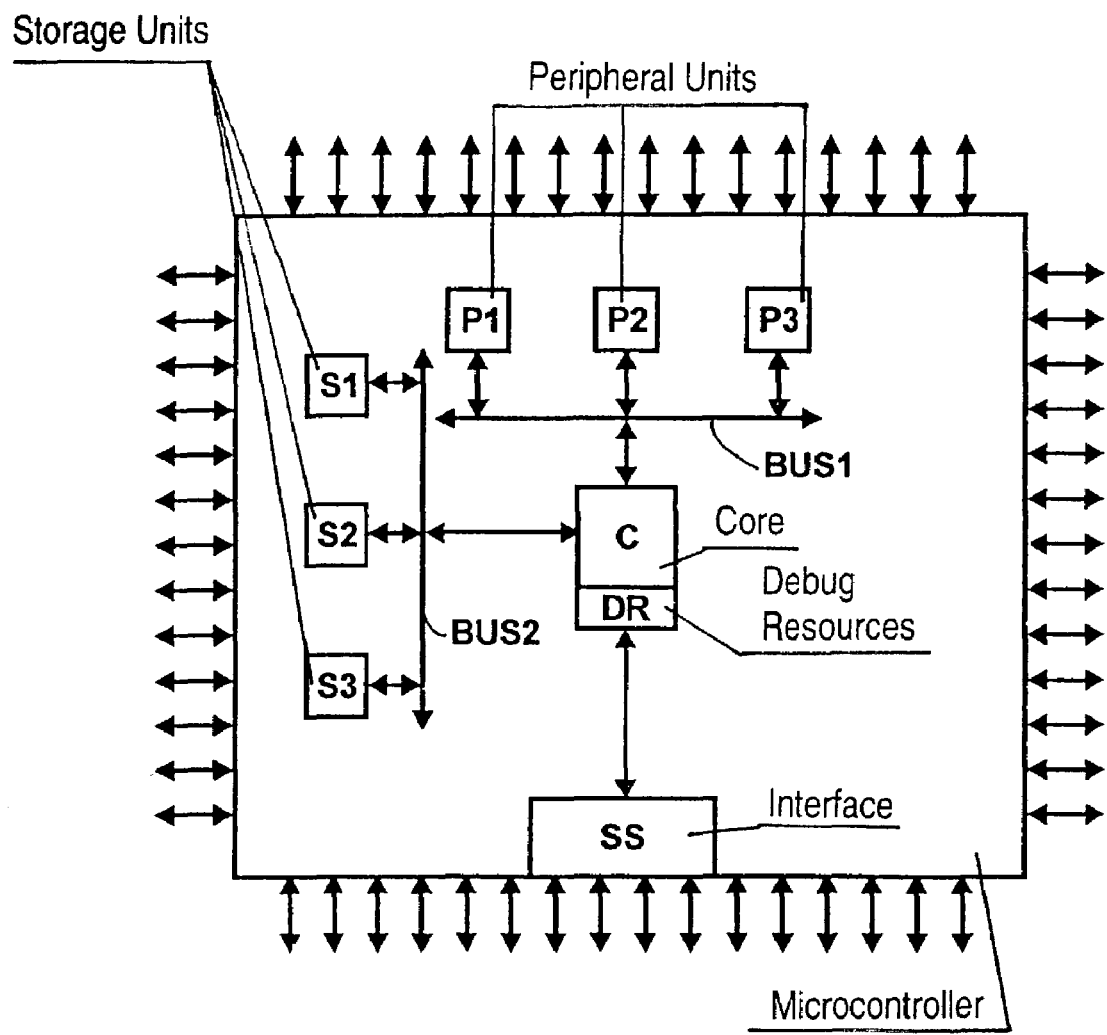
FIG. 2 is a block diagram of a prior art program-controlled unit.

Referring now to the figures of the drawing in detail and first, particularly, to FIG. 1 thereof, there is schematically shown a program-controlled unit. For the sake of completeness, it is noted that only the components of the program-controlled unit that are of particular interest are shown and described.

The program-controlled unit shown in FIG. 1 contains debug resources DRC. Additional components of the program-controlled unit are designated by a block PGEC.

The components PGEC include all the components of the program-controlled unit with the exception of the debug resources DRC. These components include the core, storage devices, peripheral units and other components of the program-controlled unit.

The debug resources DRC and the components PGEC are connected to one another via a bus TRACEBUS and control lines CTRL.

The bus TRACEBUS includes 32 lines in the example in question, but can in principle also include more or fewer lines. For the sake of completeness, it is noted that instead of the bus TRACEBUS it is also possible to provide a corresponding number of individual lines.

Signals which the debug resources DR output from the program-controlled unit when certain events occur are supplied to the debug resources DRC by the components PGEC via the bus TRACEBUS. In the example in question, the aforesaid signals are control signals which are transferred within individual components of the components PGEC or between individual ones or a plurality of the components PGEC, that is to say for example within the core, or within a peripheral unit, or between the core and a peripheral unit. However, the aforesaid signals include, for example, but do not exclusively include, interrupt request signals, signals which signal interference or faults, ready signals etc. However, the debug resources DRC can also be supplied via the base TRACEBUS with addresses or data, for example, a storage address from which data is currently being read, and/or data that is read out of a storage device, and/or the contents of specific registers, for example, the instruction pointer etc.

Via the control lines CTRL, it is possible to set, at least for specific lines of the bus TRACEBUS, the specific signal that is transmitted onto a respective bus line. As a result, it is possible, for example, to transmit onto a specific bus line either an interrupt request signal from a first peripheral unit, or an interrupt request signal from a second peripheral unit, or a ready signal of the first peripheral unit. This proves advantageous because as a result it is possible to select, from any desired number of signals, those signals which will be supplied to the debug resources DRC. The debug resources DRC contain a trace part TRACE and a watchpoint part WATCHPOINT, both parts being connected to the bus TRACEBUS.

The trace part TRACE determines when and which of the addresses, data and/or control signals supplied to it via the bus TRACEBUS are output as trace information from the program-controlled unit.

The watchpoint part WATCHPOINT monitors the occurrence of specific conditions in the addresses, data and/or control signals supplied to it via the bus TRACEBUS, and outputs a signal which signals this state to the trace part TRACE and/or from the program-controlled unit, when these conditions occur.

The trace part TRACE is composed of a masking unit MU, a register R, a first condition storage unit B1, a second condition storage unit B2, a comparator logic CU, a multiplexer MUX, a message generator MGEN and a message FIFO MFIFO.

The signals which are supplied to the trace part TRACE via the bus TRACEBUS pass into the masking unit MU in which signals which are not of interest are masked out. In the example in question, the masking out includes setting the signals which are not of interest to the value 0. For the sake of completeness, it is noted that the signals which are not of interest could also be set to the value 1. Which signals are the signals which are not of interest is prescribed to the masking unit MU by a device provided outside the program-controlled unit, via control lines (not shown in FIG. 1).

The output signals of the masking unit MU are supplied to the register R which receives and buffers the signals supplied to it at specific time intervals, for example with the clock of the system clock of the program-controlled unit.

The data stored in the register R is supplied to the comparator logic CU and the multiplexer MUX.

The comparator logic CU compares this data bit by bit with the data previously received from the register R or the trace information last output from the program-controlled unit and additionally checks whether the detected differences constitute changes in the respective bits in a specific direction, to be precise whether a predefined edge occurred in the time profile of the respective bits.

The predefined edges are stored in the first condition storage device B1 and in the second condition storage device B2.

Information indicating which bits must simultaneously have a rising edge, i.e. a change from the value 0 to the value 1 for the comparator logic CU to output a positive comparison result is stored in the first condition storage device B1; and information indicating which signals additionally must have a falling edge, i.e. a change from the value 1 to the value 0 for the comparator logic CU to output a positive comparison result is stored in the second condition storage device B2.

The storage condition devices B1 and B2 are connected via lines (not shown in FIG. 1) to a device provided outside the program-controlled unit. By using this external device it is possible to determine which bits must have which edges in the condition storage devices B1 and B2 for the comparator logic CU to output a positive comparison result.

The comparator logic CU outputs a positive comparison result, i.e. one which signals correspondence, if the bits defined in the first condition storage device B1 have changed their value from 0 to 1, and at the same time the bits defined in the second condition storage device B2 have changed their value from 1 to 0.

The comparison result of the comparator logic CU is output to the message generator MGEN.

The multiplexer MUX which has already been mentioned above is used as a data conversion device, but the data conversion device could also be implemented other than by means of a multiplexer. The multiplexer MUX passes on the data received from the register R to the message generator MGEN in sequential fashion, and in doing so the multiplexer MUX can change the positions of the bits within the data. For example, a bit which is at a position X within the data that is output by the register R, can be output by the multiplexer MUX to the message generator MGEN as the y-th bit, as a result of which the respective bit within the data received from the message generator MGEN is at a position Y. Ideally, each bit of the data received by the register R can be moved to any desired other location within the data output to the message generator MGEN. This can be an advantage, as explained in more detail below, in the generation of messages which takes place in the message generator MGEN. Preferably, at least the data which is masked out by the masking unit MU is moved to the start or to the end of the data which is output to the message generator.

As a result, as will be understood better later, the quantity of data which is to be output from the program-controlled unit in order to output the trace information which is to be output can be reduced.

The multiplexer MUX is controlled by a device provided outside the program-controlled unit, via control lines (not shown in FIG. 1).

The data which is output by the multiplexer MUX is supplied to the message generator MGEN.

The message generator MGEN assembles messages by means of which the data which is supplied to it by the multiplexer and which is the trace information to be output from the program-controlled unit is output from the program-controlled unit.

The message generator MGEN operates as a function of the comparison results supplied to it by the comparator logic CU. In the example in question, a positive comparison result causes the message generator MGEN to output an individual message or a specific number of messages or an indeterminate number of messages, or
to terminate the outputting of messages.

Individual actions, several actions or all of these actions can also be triggered by a negative comparison result or by the changing from a positive comparison result to a negative comparison result, or by the changing from a negative comparison result to a positive comparison result.

The messages which are assembled by the message generator MGEN are composed of a header and a part which contains the trace information. The part which contains the trace information is of variable length in the example in question. Those parts of the trace information that can be reliably reconstructed outside the program-controlled unit are not output from the program-controlled unit, as a result of which the message (the part thereof which contains the trace information) becomes shorter and can therefore be output from the program-controlled unit more quickly.

As the trace information that will be output includes 32 signals in the example in question, 32 bits are reserved for the part which contains the trace information. The part of a message which contains the trace information is, however, frequently shorter in the example in question. This is achieved here by virtue of the fact that:

either zeros which, during the transmission of all the trace information, would be present at the start of the part of a message which contains the trace information, or
ones which, during the transmission of all the trace information, would be present at the start of the part of a message which contains the trace information, or
zeros which, during the transmission of all the trace information, would be present at the end of the part of a message which contains the trace information, or
ones which, during the transmission of all the trace information, would be present at the end of the part of a message which contains the trace information, are not included in the part of the respective message which contains the trace information. As a result, the part of a message which contains the trace information is frequently shorter than 32 bits and can be transmitted in a shorter time than would be the case if the part of a message which contains the trace information always had the same length.

As has been already indicated above, the multiplexer MUX makes it possible for the signals that are supplied to the debug resources to be redistributed within the debug resources in such a way that messages with a minimum length can be expected. If, for example, zeros which, during the outputting of all the trace information, would be present at the start of the part of a message which contains the trace information are not included in the part of the respective message which contains the trace information, the signals which are supplied to the debug resources are preferably redistributed in such a way that the trace information that is supplied to the message generator contains, in the region which would come to be located at the start of the part of a message which contains the trace information during the outputting of all the trace information, those addresses, data and/or control signals which have been masked out by the masking unit MU or which have the value 0 for most of the time.

Alternatively, it is possible to output the trace information not by outputting the addresses, data and/or control signals themselves which are to be output, but rather by outputting data which represents the changes in the respective current addresses, data and/or control signals with respect to the addresses, data and/or control signals on which the trace information last output was based. The data to be transmitted in this case can be determined by an XOR logic operation performed on the current addresses, data and/or control signals with the addresses, data and/or control signals on which the trace information last output was based. In this case, too, it is, of course, possible, to make use of the possibility described above of not including in the message zeros or ones, which during the outputting of all of the trace information, would be present at the start or at the end of the part of a message which contains the trace information. However, in this context, a different redistribution of the data by the multiplexer MUX may prove advantageous.

Irrespective of all of this, it may prove advantageous if at least in some cases, information (time stamps) which indicates at what time the trace information contained in the message, to be more precise the addresses, data and/or control signals on which the information is based could be observed in the program-controlled unit, is added to the messages.

Messages generated by the message generator MGEN are written into the message FIFO MFIFO. They are output from the message MFIFO, in the sequence in which they were written into the message FIFO, onto a bus MBUS and are output out of the program-controlled unit via the bus MBUS.

The watchpoint part WATCHPOINT of the debug resources DRC is composed of a logic unit L, a message generator MGEN2, and a message FIFO MFIFO2.

The signals which are supplied to the watchpoint part WATCHPOINT via the bus TRACEBUS pass into the logic unit L which checks whether the signals fulfil predefined conditions.

The logic unit L is composed, in the example in question, of an inverter device IU, a masking unit MU2, and a logic unit VU, which are arranged one behind the other in the aforesaid sequence. It should already be pointed out at this point that the logic unit L can also contain further components and/or other components and that the components can also be wired in any other desired way. The structure of the logic unit L depends on the conditions that the logic unit L will be capable of checking.

One, several or all of the bits supplied to the inverter device are inverted by the inverter device IU. Which bits are inverted can be determined in the inverter device IU by means of a device provided outside the program-controlled unit, via control lines (not shown in FIG. 1).

The data which is generated by the inverter device IU is passed on to the masking unit MU2. The masking unit MU2 masks out bits which are not of interest. In the example in question, the masking out includes setting the signals which are not of interest to the value 0. For the sake of completeness, it is noted that the signals which are not of interest could also be set to the value 1. Which of the signals are not of interest is prescribed to the masking unit MU2 by a device provided outside the program-controlled unit, via control lines (not shown in FIG. 1).

The output signals of the masking unit MU2 are supplied to the logic element VU. The logic element VU subjects selected bits of the data supplied to it to specific logic operations. In the example in question, the logic operations are AND logic operations and/or OR logic operations. However, in addition or as an alternative it is also possible to carry out any other desired logic operations, for example NAND, NOR, XOR logic operations etc. Which logic operations will be performed on which bits is prescribed to the logic element VU by a device provided outside the program-controlled unit, via control lines (not shown in FIG. 1).

The result which is output by the logic element VU is composed of a single bit whose value indicates whether or not the condition that is checked by the watchdog part WATCHDOG is fulfilled.

It could also be provided that a plurality of conditions are checked simultaneously by an appropriately structured logic unit. In this case, the result that is output by the logic element VU would include a plurality of bits. This plurality of bits could indicate whether, and if appropriate, which condition or conditions are respectively fulfilled.

The output signal of the logic element VU is at the same time the output signal of the logic L and is supplied to the message generator MGEN2.

Whenever the signal supplied to the message generator MGEN2 signals to it that the condition that is monitored is fulfilled, the message generator MGEN2 generates a message which is output, as in the trace part TRACE, from the program-controlled unit via a message FIFO MFIFO2 and the bus MBUS. If, and for as long as, the condition is not fulfilled, no message is generated or output. The message signals to a device provided outside the program-controlled unit whether conditions to be monitored are fulfilled, and if so which are fulfilled at this particular time.

Time stamps can be added to individual messages, to several or to all of the messages generated by the message generator MGEN2 in the same way as the messages generated by the message generator MGEN.

In the example in question, the output signal of the logic element VU is also supplied to the trace part and can be used there in a wide variety of ways depending on the respective requirements. Conceivable possible uses for the output signal of the logic element VU include, for example, that depending on the output signal:

the outputting of a message by the trace part is brought about or enabled, or the outputting of another specific number of messages by the trace part is brought about or enabled, or the outputting of an indeterminate number of messages is brought about or enabled by the trace part, or the outputting of messages by the trace part is stopped or disabled, and/or the settings of the trace part components, in particular of the masking unit MU, of the comparator logic CU, of the conditions storage devices B1 and B2, of the multiplexer MUX and/or of the message generator MGEN are changed.

The program-controlled unit described, to be more precise the debug resources thereof, make it possible, independently of the details of the practical implementation, to output comprehensively with little expenditure, trace information which is required to observe the operations occurring within the program-controlled unit.

I claim:

1. A program-controlled unit, comprising:
debug resources using trace information including given information selected from the group consisting of selected addresses, data signals, and control signals; and
an output for outputting the trace information to trace a course of operations occurring within the program-controlled unit;
said debug resources monitoring whether a predefined change in a level of at least one predefined bit of the given information in the trace information has taken place;
said debug resources performing an operation selected from the group consisting of starting to generate the trace information as a result of the monitoring and stopping to generate the trace information as a result of the monitoring;
said debug resources including a comparator logic device for obtaining a result by checking if there is a predefined change in the level of the at least one predefined bit of the given information being supplied to said debug resources;
said debug resources including a message generator generating a message including the trace information that will be output;
said debug resources outputting the message;
said message generator operating as a function of the result obtained by said comparator logic device; and
said message generator causing at least one event of the group consisting of:
an individual message to be output if the result obtained by said comparator logic device signals that a condition being checked by said comparator logic device is fulfilled;
a specific number of messages to be output if the result obtained by said comparator logic device signals that a condition being checked by said comparator logic device is fulfilled;
an indeterminate number of messages to be output if the result obtained by said comparator logic device signals that a condition being checked by said comparator logic device is fulfilled;
stopping messages from being output if the result obtained by said comparator logic device signals that a condition being checked by said comparator logic device is fulfilled;
an individual message to be output if the result obtained by said comparator logic device signals that a condition being checked by said comparator logic device is not fulfilled;
a specific number of messages to be output if the result obtained by said comparator logic device signals that a condition being checked by said comparator logic device is not fulfilled;
an indeterminate number of messages to be output if the result obtained by said comparator logic device signals that a condition being checked by said comparator logic device is not fulfilled; and
stopping messages from being output if the result obtained by said comparator logic device signals that a condition being checked by said comparator logic device is not fulfilled.

2. The program-controlled unit according to claim 1, wherein:
the trace information, which is output at said output, includes data that represents changes in current values of the given information with respect to immediately previous values of the given information.

3. The program-controlled unit according to claim 1, comprising:
components;
the trace information including control signals being transferred within said components.

4. The program-controlled unit according to claim 1, comprising:
components;
the trace information including control signals being transferred between said components.

5. The program-controlled unit according to claim 4, wherein: the trace information includes interrupt request signals.

6. The program-controlled unit according to claim 4, wherein: the trace information includes signals for signaling an occurrence of a fault.

7. The program-controlled unit according to claim 4, wherein: the trace information includes signals for signaling a successful execution of an action.

8. The program-controlled unit according to claim 1, wherein:
said debug resources have input terminals f or receiving the given information that will be contained in the trace information that will be output; and
it is possible to determine, from outside the program-controlled unit, which given information selected from the group consisting of the addresses, the data signals, and the control signals are supplied to said input terminals.

9. The program-controlled unit according to claim 1, wherein:
said debug resources includes a masking unit for masking out particular ones of the given information that will not be taken into account; and
the particular ones of the given information is selected from a group consisting of ones of the addresses, ones of the data, and ones of the control signals that are supplied to said debug resources.

10. The program-controlled unit according to claim 9, wherein: the particular ones of the given information that will be masked out can be externally determined.

11. The program-controlled unit according to claim 1, wherein:
said debug resources is supplied with the given information; and
said debug resources includes a comparator logic device for checking whether there is a predefined change in the level of the at least one predefined bit of the given information that is being supplied to said debug resources.

12. The program-controlled unit according to claim 11, wherein: by using the predefined change it is determined which bit of the at least one predefined bit of the given information being supplied to said debug resources needs to have a level change for said comparator logic device to output a positive comparison result.

13. The program-controlled unit according to claim 11, wherein: the predefined change can be externally set.

14. The program-controlled unit according to claim 1, wherein:
said debug resources includes a message generator that generates a message including the trace information that will be output; and
said debug resources causes the message to be output.

15. The program-controlled unit according to claim 14, wherein:
the message includes a part that contains the trace information; and
the part of the message has a variable length.

16. The program-controlled unit according to claim 15, wherein:
the length of the part of the message that contains the trace information depends on a content of the trace information that will be output.

17. The program-controlled unit according to claim 15, wherein:
the part of the message that contains the trace information contains only a part of the trace information actually to be output.

18. The program-controlled unit according to claim 15, wherein:
portions of the trace information that can be externally reconstructed are not output at said output.

19. The program-controlled unit according to claim 18, wherein:
zeros, which during a transmission of all of the trace information, would normally be present at a beginning of the part of the message that contains the trace information, are not included in the part of the message that contains the trace information.

20. The program-controlled unit according to claim 18, wherein:
ones, which during a transmission of all of the trace information, would normally be present at a beginning of the part of the message that contains the trace information, are not included in the part of the message that contains the trace information.

21. The program-controlled unit according to claim 18, wherein:
zeros, which during a transmission of all of the trace information, would normally be present at an end of the part of the message that contains the trace information, are not included in the part of the message that contains the trace information.

22. The program-controlled unit according to claim 18, wherein:
ones, which during a transmission of all of the trace information, would normally be present at an end of the part of the message that contains the trace information, are not included in the part of the message that contains the trace information.

23. The program-controlled unit according to claim 1, wherein:
the given information includes a plurality of bits that are supplied to said debug resources; and
said debug resources includes a converter device that converts the plurality of the bits of the given information that are supplied to said debug resources into a serial sequence of bits, and a position of the bits within the sequence of bits being adjustable.

24. The program-controlled unit according to claim 23, wherein: the predefined sequence can be externally set by a device that is external from the program-controlled unit.

25. The program-controlled unit according to claim 1, wherein:

said debug resources includes a message generator that generates a message including the trace information that will be output;

said debug resources causes the message to be output; and the message includes information relating to a time at which the given data in the trace information appeared in the program-controlled unit.

26. The program-controlled unit according to claim 1, wherein:

said debug resources includes a watchdog unit that checks a condition and that outputs a signal indicating whether or not the condition is fulfilled;

said debug resources includes a component that assembles the trace information that will be output; and said component operates dependently on said watchdog unit.

27. The program-controlled unit according to claim 26, wherein: said watchdog unit checks the condition by checking whether the given information in the trace information is in a particular state.

28. The program-controlled unit according to claim 1, wherein:

said debug resources includes a watchdog unit that checks a condition and that outputs a signal indicating whether or not the condition is fulfilled;

said debug resources includes a component that outputs the trace information; and said component operates dependently on said watchdog unit.

29. The program-controlled unit according to claim 28, wherein: said watchdog unit checks the condition by checking whether the given information in the trace information is in a particular state.

30. The program-controlled unit according to claim 1, wherein: the trace information is stored before being output at said output.

31. The program-controlled unit according to claim 30, wherein: the trace information that is stored is output at said output in response to a corresponding request from a device provided external from the program-controlled unit.

32. A program-controlled unit, comprising:

debug resources using trace information including given information selected from the group consisting of selected addresses, data signals, and control signals; and an output for outputting the trace information to trace a course of operations occurring within the program-controlled unit;

the trace information that is output forming a component of a message; and the component having a variable length;

the message including a part containing the trace information; and the part of the message having a variable length;

portions of the trace information that can be externally reconstructed being not output at said output;

zeros, which during a transmission of all of the trace information, would normally be present at a beginning of the part of the message that contains the trace information, being not included in the part of the message that contains the trace information;

ones, which during a transmission of all of the trace information, would normally be present at a beginning of the part of the message that contains the trace information, being not included in the part of the message that contains the trace information;

zeros, which during a transmission of all of the trace information, would normally be present at an end of the part of the message that contains the trace information, being not included in the part of the message that contains the trace information; and ones, which during a transmission of all of the trace information, would normally be present at an end of the part of the message that contains the trace information, being not included in the part of the message that contains the trace information.

33. The program-controlled unit according to claim 32, wherein:

the trace information, which is output at said output, includes data that represents changes in current values of the given information with respect to immediately previous values of the given information.

34. The program-controlled unit according to claim 32, comprising:

components;

the trace information including control signals being transferred within said components.

35. The program-controlled unit according to claim 32, comprising:

components;

the trace information including control signals being transferred between said components.

36. The program-controlled unit according to claim 35, wherein: the trace information includes interrupt request signals.

37. The program-controlled unit according to claim 35, wherein: the trace information includes signals for signaling an occurrence of a fault.

38. The program-controlled unit according to claim 35, wherein: the trace information includes signals for signaling a successful execution of an action.

39. The program-controlled unit according to claim 32, wherein:

said debug resources have input terminals for receiving the given information that will be contained in the trace information that will be output; and it is possible to determine, from outside the program-controlled unit, which given information selected from the group consisting of the addresses, the data signals, and the control signals are supplied to said input terminals.

40. The program-controlled unit according to claim 32, wherein:

said debug resources includes a masking unit for masking out particular ones of the given information that will not be taken into account; and the particular ones of the given information is selected from a group consisting of ones of the addresses, ones of the data, and ones of the control signals that are supplied to said debug resources.

41. The program-controlled unit according to claim 40, wherein: the particular ones of the given information that will be masked out can be externally determined.

42. The program-controlled unit according to claim 32, wherein:

said debug resources is supplied with the given information; and said debug resources includes a comparator logic device for checking whether there is a predefined change in a level of at least one predefined bit of the given information that is being supplied to said debug resources.

43. The program-controlled unit according to claim 42, wherein: by using the predefined change it is determined which bits of the given information being supplied to said debug resources need to have a level change for said comparator logic device to output a positive comparison result.

44. The program-controlled unit according to claim 42, wherein: the predefined change can be externally set.

45. The program-controlled unit according to claim 32, wherein:
said debug resources includes a message generator that generates a message including the trace information that will be output; and
said debug resources causes the message to be output.

46. The program-controlled unit according to claim 32, wherein:
the length of the part of the message that contains the trace information depends on a content of the trace information that will be output.

47. The program-controlled unit according to claim 32, wherein:
the part of the message that contains the trace information contains only a part of the trace information actually to be output.

48. The program-controlled unit according to claim 32, wherein:
the given information includes a plurality of bits that are supplied to said debug resources; and
said debug resources includes a converter device that converts the plurality of the bits of the given information that are supplied to said debug resources into a serial sequence of bits, and a position of the bits within the sequence of bits being adjustable.

49. The program-controlled unit according to claim 48, wherein: the predefined sequence can be externally set by a device that is external from the program-controlled unit.

50. The program-controlled unit according to claim 32, wherein:
said debug resources includes a comparator logic device for obtaining a result by checking whether there is a predefined change in a level of at least one predefined bit of the given information that is being supplied to said debug resources;
said debug resources includes a message generator that generates a message including the trace information that will be output;
said debug resources outputs the message; and
said message generator operates as a function of the result obtained by said comparator logic device.

51. The program-controlled unit according to claim 50, wherein: said message generator causes an individual message to be output if the result obtained by said comparator logic device signals that a condition being checked by said comparator logic device is fulfilled.

52. The program-controlled unit according to claim 50, wherein: said message generator causes a specific number of messages to be output if the result obtained by said comparator logic device signals that a condition being checked by said comparator logic device is fulfilled.

53. The program-controlled unit according to claim 50, wherein: said message generator causes an indeterminate number of messages to be output if the result obtained by said comparator logic device signals that a condition being checked by said comparator logic device is fulfilled.

54. The program-controlled unit according to claim 50, wherein: said message generator stops messages from being output if the result obtained by said comparator logic device signals that a condition being checked by said comparator logic device is fulfilled.

55. The program-controlled unit according to claim 50, wherein: said message generator causes an individual message to be output if the result obtained by said comparator logic device signals that a condition being checked by said comparator logic device is not fulfilled.

56. The program-controlled unit according to claim 50, wherein: said message generator causes a specific number of messages to be output if the result obtained by said comparator logic device signals that a condition being checked by said comparator logic device is not fulfilled.

57. The program-controlled unit according to claim 50, wherein: said message generator causes an indeterminate number of messages to be output if the result obtained by said comparator logic device signals that a condition being checked by said comparator logic device is not fulfilled.

58. The program-controlled unit according to claim 50, wherein: said message generator stops messages from being output if the result obtained by said comparator logic device signals that a condition being checked by said comparator logic device is not fulfilled.

59. The program-controlled unit according to claim 32, wherein:
said debug resources includes a message generator that generates a message including the trace information that will be output;
said debug resources causes the message to be output; and
the message includes information relating to a time at which the given data in the trace information appeared in the program-controlled unit.

60. The program-controlled unit according to claim 32, wherein:
said debug resources includes a watchdog unit that checks a condition and that outputs a signal indicating whether or not the condition is fulfilled;
said debug resources includes a component that assembles the trace information that will be output; and
said component operates dependently on said watchdog unit.

61. The program-controlled unit according to claim 60, wherein: said watchdog unit checks the condition by checking whether the given information in the trace information is in a particular state.

62. The program-controlled unit according to claim 32, wherein:
said debug resources includes a watchdog unit that checks a condition and that outputs a signal indicating whether or not the condition is fulfilled;
said debug resources includes a component that outputs the trace information; and
said component operates dependently on said watchdog unit.

63. The program-controlled unit according to claim 62, wherein: said watchdog unit checks the condition by checking whether the given information in the trace information is in a particular state.

64. The program-controlled unit according to claim 32, wherein: the trace information is stored before being output at said output.

65. The program-controlled unit according to claim 64, wherein: the trace information that is stored is output at said output in response to a corresponding request from a device provided external from the program-controlled unit.

66. A program-controlled unit, comprising:
debug resources using trace information including given information selected from the group consisting of selected addresses, data signals, and control signals; and an output for outputting the trace information to trace a course of operations occurring within the program-controlled unit;

the trace information that is output forming a component of a message;

it being possible to determine which trace information will be located at which point within the message;

the given information includes a plurality of bits supplied to said debug resources; and said debug resources includes a converter device that converts the plurality of the bits of the given information that are supplied to said debug resources into a serial sequence of bits, and a position of the bits within the sequence of bits being adjustable.

67. The program-controlled unit according to claim 66, wherein:

the trace information, which is output at said output, includes data that represents changes in current values of the given information with respect to immediately previous values of the given information.

68. The program-controlled unit according to claim 66, comprising:

components;

the trace information including control signals being transferred within said components.

69. The program-controlled unit according to claim 66, comprising:

components;

the trace information including control signals being transferred between said components.

70. The program-controlled unit according to claim 69, wherein: the trace information includes interrupt request signals.

71. The program-controlled unit according to claim 69, wherein: the trace information includes signals for signaling an occurrence of a fault.

72. The program-controlled unit according to claim 69, wherein: the trace information includes signals for signaling a successful execution of an action.

73. The program-controlled unit according to claim 66, wherein:

said debug resources have input terminals for receiving the given information that will be contained in the trace information that will be output; and it is possible to determine, from outside the program-controlled unit, which given information selected from the group consisting of the addresses, the data signals, and the control signals are supplied to said input terminals.

74. The program-controlled unit according to claim 66, wherein:

said debug resources includes a masking unit for masking out particular ones of the given information that will not be taken into account; and the particular ones of the given information is selected from a group consisting of ones of the addresses, ones of the data, and ones of the control signals that are supplied to said debug resources.

75. The program-controlled unit according to claim 74, wherein: the particular ones of the given information that will be masked out can be externally determined.

76. The program-controlled unit according to claim 66, wherein:

said debug resources is supplied with the given information; and said debug resources includes a comparator logic device for checking whether there is a predefined change in a level of at least one predefined bit of the given information that is being supplied to said debug resources.

77. The program-controlled unit according to claim 76, wherein: by using the predefined change it is determined which bits of the given information being supplied to said debug resources needs to have a level change for said comparator logic device to output a positive comparison result.

78. The program-controlled unit according to claim 76, wherein: the predefined change can be externally set.

79. The program-controlled unit according to claim 66, wherein:

said debug resources includes a message generator that generates a message including the trace information that will be output; and said debug resources causes the message to be output.

80. The program-controlled unit according to claim 79, wherein:

the message includes a part that contains the trace information; and the part of the message has a variable length.

81. The program-controlled unit according to claim 80, wherein:

the length of the part of the message that contains the trace information depends on a content of the trace information that will be output.

82. The program-controlled unit according to claim 80, wherein:

the part of the message that contains the trace information contains only a part of the trace information actually to be output.

83. The program-controlled unit according to claim 80, wherein:

portions of the trace information that can be externally reconstructed are not output at said output.

84. The program-controlled unit according to claim 83, wherein:

zeros, which during a transmission of all of the trace information, would normally be present at a beginning of the part of the message that contains the trace information, are not included in the part of the message that contains the trace information.

85. The program-controlled unit according to claim 83, wherein:

ones, which during a transmission of all of the trace information, would normally be present at a beginning of the part of the message that contains the trace information, are not included in the part of the message that contains the trace information.

86. The program-controlled unit according to claim 83, wherein:

zeros, which during a transmission of all of the trace information, would normally be present at an end of the part of the message that contains the trace information, are not included in the part of the message that contains the trace information.

87. The program-controlled unit according to claim 83, wherein:

ones, which during a transmission of all of the trace information, would normally be present at an end of the part of the message that contains the trace information, are not included in the part of the message that contains the trace information.

88. The program-controlled unit according to claim 66, wherein: the predefined sequence can be externally set by a device that is external from the program-controlled unit.

89. The program-controlled unit according to claim 66, wherein:

said debug resources includes a comparator logic device for obtaining a result by checking whether there is a predefined change in a level of at least one predefined bit of the given information that is being supplied to said debug resources;

said debug resources includes a message generator that generates a message including the trace information that will be output;

said debug resources outputs the message; and said message generator operates as a function of the result obtained by said comparator logic device.

90. The program-controlled unit according to claim 89, wherein: said message generator causes an individual message to be output if the result obtained by said comparator logic device signals that a condition being checked by said comparator logic device is fulfilled.

91. The program-controlled unit according to claim 89, wherein: said message generator causes a specific number of messages to be output if the result obtained by said comparator logic device signals that a condition being checked by said comparator logic device is fulfilled.

92. The program-controlled unit according to claim 89, wherein: said message generator causes an indeterminate number of messages to be output if the result obtained by said comparator logic device signals that a condition being checked by said comparator logic device is fulfilled.

93. The program-controlled unit according to claim 89, wherein: said message generator stops messages from being output if the result obtained by said comparator logic device signals that a condition being checked by said comparator logic device is fulfilled.

94. The program-controlled unit according to claim 89, wherein: said message generator causes an individual message to be output if the result obtained by said comparator logic device signals that a condition being checked by said comparator logic device is not fulfilled.

95. The program-controlled unit according to claim 89, wherein: said message generator causes a specific number of messages to be output if the result obtained by said comparator logic device signals that a condition being checked by said comparator logic device is not fulfilled.

96. The program-controlled unit according to claim 89, wherein: said message generator causes an indeterminate number of messages to be output if the result obtained by said comparator logic device signals that a condition being checked by said comparator logic device is not fulfilled.

97. The program-controlled unit according to claim 89, wherein: said message generator stops messages from being output if the result obtained by said comparator logic device signals that a condition being checked by said comparator logic device is not fulfilled.

98. The program-controlled unit according to claim 66, wherein:

said debug resources includes a message generator that generates a message including the trace information that will be output;

said debug resources causes the message to be output; and the message includes information relating to a time at which the given data in the trace information appeared in the program-controlled unit.

99. The program-controlled unit according to claim 66, wherein:

said debug resources includes a watchdog unit that checks a condition and that outputs a signal indicating whether or not the condition is fulfilled;

said debug resources includes a component that assembles the trace information that will be output; and said component operates dependently on said watchdog unit.

100. The program-controlled unit according to claim 99, wherein: said watchdog unit checks the condition by checking whether the given information in the trace information is in a particular state.

101. The program-controlled unit according to claim 66, wherein:

said debug resources includes a watchdog unit that checks a condition and that outputs a signal indicating whether or not the condition is fulfilled;

said debug resources includes a component that outputs the trace information; and said component operates dependently on said watchdog unit.

102. The program-controlled unit according to claim 101, wherein: said watchdog unit checks the condition by checking whether the given information in the trace information is in a particular state.

103. The program-controlled unit according to claim 66, wherein: the trace information is stored before being output at said output.

104. The program-controlled unit according to claim 103, wherein: the trace information that is stored is output at said output in response to a corresponding request from a device provided external from the program-controlled unit.

* * * * *